No. 847,230. PATENTED MAR. 12, 1907.
L. BROCKT.
APPARATUS FOR SORTING ARTICLES ACCORDING TO WEIGHT.
APPLICATION FILED JUNE 16, 1905.

Witnesses.
Frederick Cleveland
Samuel Percival

Inventor.
Leopold Brockt
By Wheat & Mackenzie
Attorneys

UNITED STATES PATENT OFFICE.

LEOPOLD BROCKT, OF BRESLAU, GERMANY.

APPARATUS FOR SORTING ARTICLES ACCORDING TO WEIGHT.

No. 847,230.        Specification of Letters Patent.        Patented March 12, 1907.

Application filed June 16, 1905. Serial No. 265,578.

*To all whom it may concern:*

Be it known that I, LEOPOLD BROCKT, a subject of the Emperor of Germany, residing at 80 Matthiasstrasse, Breslau, Germany, have invented certain new and useful Improvements in Apparatus for Sorting Articles According to Weight; and I do hereby declare the following to be a full, clear, and exact description of the invention, such as will enable others skilled in the art to which it appertains to make and use the same.

This invention relates to apparatus for sorting articles, such as cardboards or the like, according to their weight and comprises a table acting as a scale and chutes or shelves arranged at different heights in front of the same, from which the weighed articles can be conveyed to various points. When the single articles which are to be weighed come successively onto the weighing-table, the table sinks to a certain degree, according to the load, so that when the particular article slides off the table it comes onto one of the higher or lower situated shelves, according to its weight. Consequently each shelf always receives pieces of the same weight, so that hereby the different articles are sorted according to weight.

This new device is particularly useful in connection with the manufacture of cardboard, as the cardboards made by the same machine vary in weight, and the sorting of the same has had to be effected hitherto in a tedious manner by weighing each cardboard by hand.

Figure 1:
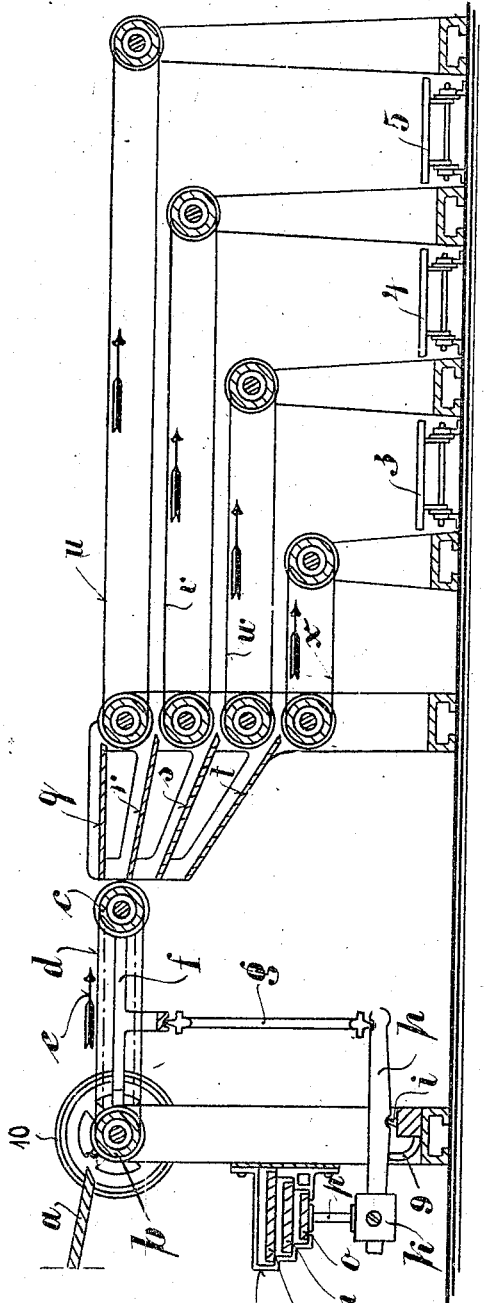
Figure 2:
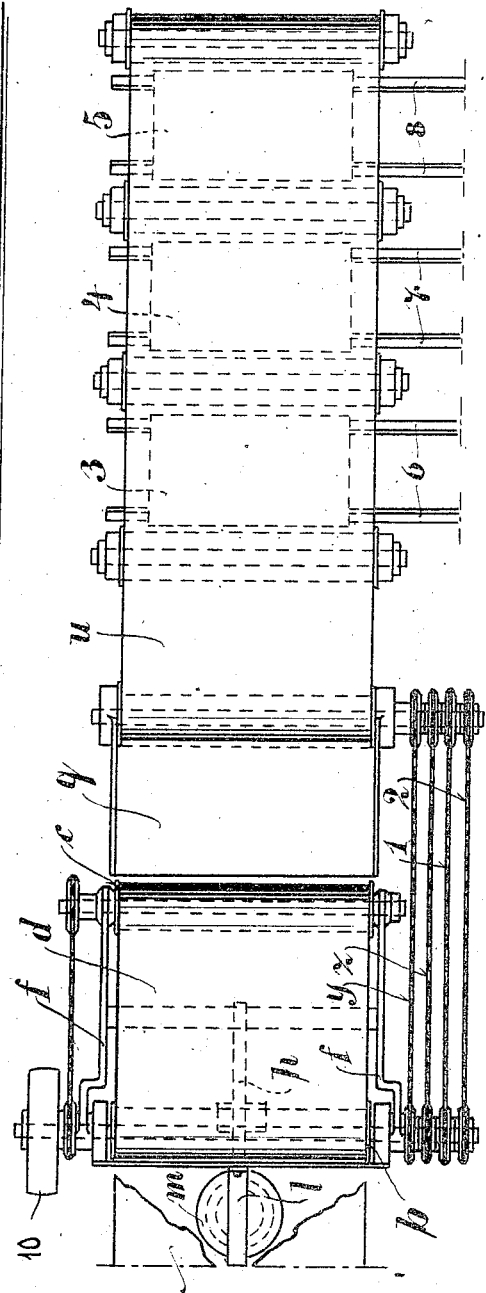

In the drawing one form of the invention is shown applied to the sorting of cardboards, Figure 1 being a longitudinal vertical section, and Fig. 2 a plan of the machine.

$a$ is the feed-table, coming from the smoothing or finishing mechanism. The weighing-table is formed by the rollers $b$ and $c$, over which the conveying-band $d$, which runs in the direction of the arrow $e$, is carried. The rollers $b$ and $c$ are connected together by the side bars $f$ and are supported by means of the knife-edge bar $g$ on the balance-beam $h$. The balance-beam rests on the knife-edge $i$, and, together with the weighing-table, is balanced by a weight $k$. The disks $m$, $n$, and $o$, which act as weights, are arranged one above the other at slight distances apart in a weight-holder $l$, so that when the weight $k$ is moved the different weights $o\ n\ m$ are successively raised by the pillar $p$, gradually increasing the counterweight of the balance-beam $h$. The weighing-table is retained in its highest position by a stop 9.

The pillar $p$ corresponds to the weight of the lightest cardboard to be weighed. If the weight of the lightest cardboard be five hundred grams, for example, the pillar $p$ would only press against the weight-disk $o$ when a cardboard exceeding five hundred grams in weight came onto the weighing-table. Assuming, then, that the different weights $o\ n\ m$ each weigh twenty grams, the table remains in its starting position until the weight $o$ is overcome, and this occurs when a cardboard weighing more than five hundred and twenty grams comes onto the conveying-band $d$. If the cardboard weighs more than five hundred and twenty grams, the weight-disk $o$ is raised until it strikes against the disk $n$. The disk $n$ is only raised, and the table-plate thereby further lowered, however, when a cardboard exceeding five hundred and forty grams in weight is on the table, and so on.

In front of the weighing-table different shelves or chutes $q\ r\ s\ t$ are arranged one above another and lead to conveying-bands $u\ v\ w\ x$, which are driven in the direction of the arrows from the shaft of the roller $b$ by chain-gear $y\ z\ 1\ 2$ or in some other suitable manner. The shaft of the roller $b$ has at one end a pulley 10 to receive a driving belt or band; but any other suitable means may be provided for imparting motion to said shaft. The conveying-bands $u$ to $x$ are of different lengths, so that the cardboards conveyed thereon are carried to different points. In order to facilitate the removal of the cardboards which have been sorted, trolleys 3 4 5, which run on rails 6 7 8, are arranged behind each conveying-band.

The action of the device is as follows: Each cardboard reaches the conveying-band $d$ from the table $a$ of the smoothing mechanism and is pushed thereby in the direction of the arrow $e$. According to the weight of the cardboard the weighing-table either remains in its starting position or sinks so that it comes before the shelf $s$ or $t$, accordingly as none of the disks $o\ n\ m$ or several of them are raised by the weight of the cardboard. According to the previously-mentioned example the cardboards weighing from five hundred to five hundred and twenty grams reach the shelf $q$, those weighing from five hundred and twenty-one to five hundred and forty grams the shelf $r$, those weighing from five hundred and forty-one to five hundred and sixty grams the shelf s, and those weighing from five hundred and sixty-one to five hundred and eighty grams the shelf t. The different cardboards are then further conveyed from the shelves by the corresponding conveying-bands. The cardboards coming from the shelf t onto the conveying-band x reach the trolley 3. The conveying-band w takes the cardboards from the shelf s and conveys them to the trolley 4. The cardboards from the shelf r are conveyed by the conveying-band v to the trolley 5, while the conveying-band u conveys the cardboards from the shelf q.

The weighing device acting in stages may of course be replaced by one acting continuously, and this is advisable when more exact weighing is required. The shelves q r s t are in such case not fixed, as in the example given, but are better arranged adjustably, so that the weighed object can be removed from the table whatever may be the extent to which the table is lowered.

If with the form illustrated the device is to be adjusted for other weights, this can be easily done by shifting the weight k and changing the disks o n, and m.

What I claim, and desire to secure by Letters Patent, is—

1. An apparatus for sorting articles according to weight, comprising a scale-beam, a pivotally-mounted, vertically-swinging feed-table having its free end supported by said scale-beam, and a plurality of superposed shelves arranged adjacent to the free or swinging end of said table to receive articles therefrom.

2. An apparatus for sorting articles according to weight comprising a scale-beam, a rising-and-falling feed-table mounted on one end of the beam, a series of weights adapted to be automatically imposed at intervals on the other end of the beam as the table is lowered more or less by articles of different weight, and means for receiving the articles from the feed-table at different heights according to their weight and conveying them away to separate piles.

3. An apparatus for sorting articles according to weight comprising a scale-beam, a rising-and-falling feed-table mounted on one end of the beam, and carrying an endless traveling band, a series of weights arranged above the other end of the scale-beam, means for supporting the weights at different heights above the scale-beam so that one or more act on the end of the beam according to the height to which it is raised, thus causing the feed-table to assume a series of definite positions according to the load upon it, a series of shelves arranged at different heights to receive the articles of different weight from the feed-table, and endless conveyers adapted to carry away the articles.

In testimony whereof I have affixed my signature in presence of two witnesses.

LEOPOLD BROCKT.

Witnesses:
 ERNST KATZ,
 ALBERT SCHENK.